UNITED STATES PATENT OFFICE.

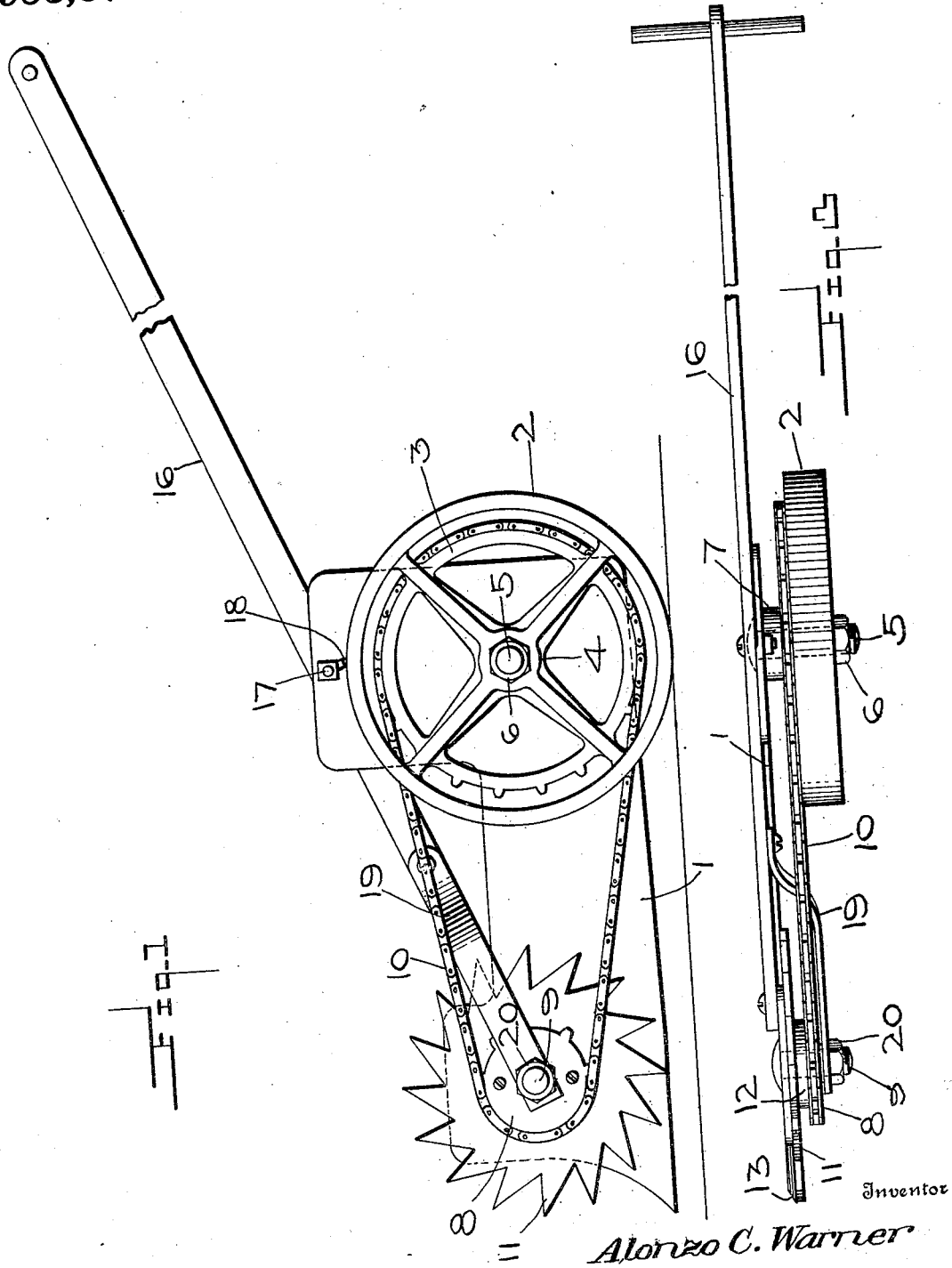

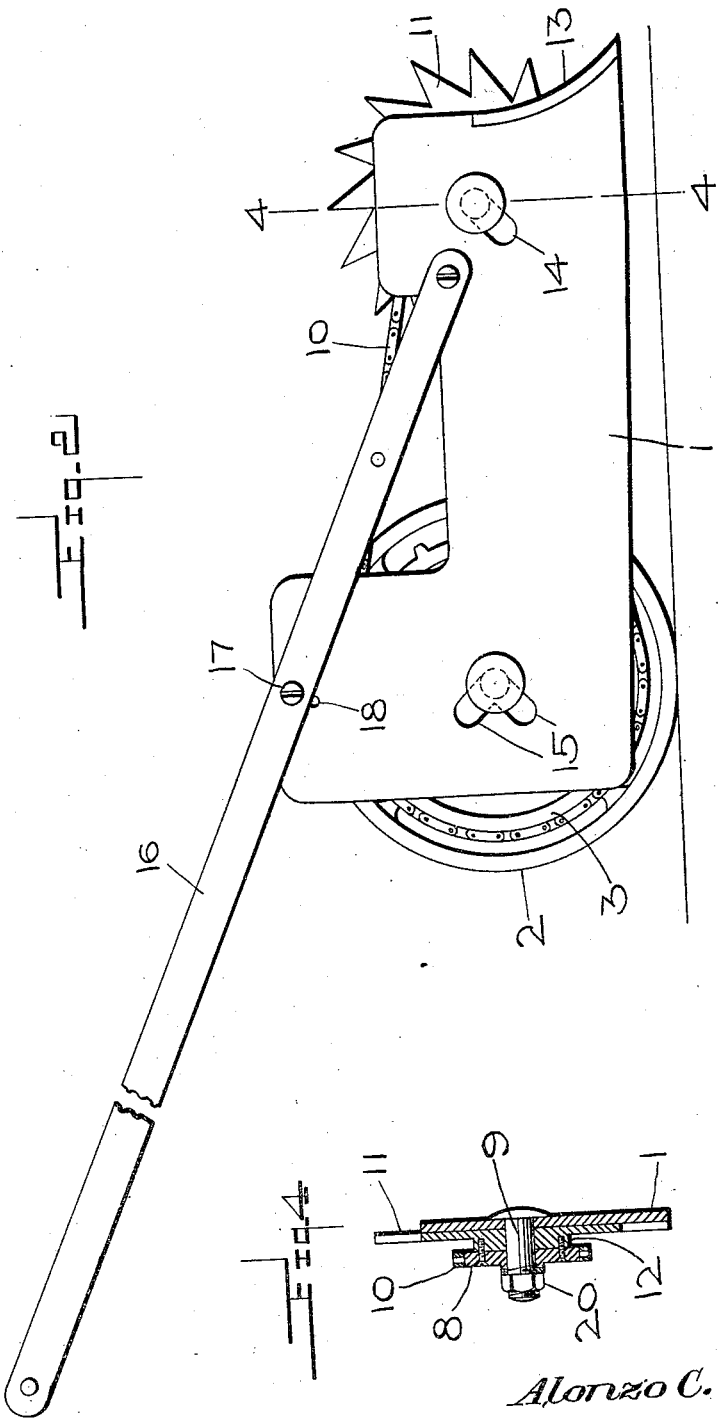

ALONZO C. WARNER, OF STOCKTON, CALIFORNIA.

LAWN-TRIMMER.

953,876.  Specification of Letters Patent.  Patented Apr. 5, 1910.

Application filed April 6, 1909. Serial No. 488,302.

*To all whom it may concern:*

Be it known that I, ALONZO C. WARNER, a citizen of the United States, residing at the city of Stockton, in the county of San Joaquin and State of California, have invented certain new and useful Improvements in Lawn-Trimmers, of which the following is a specification.

This invention relates to lawn trimmers and has for its object to provide a machine by means of which grass at the edges of curbing or side walks may be easily trimmed.

A further object is to provide a machine of this class in which the cutting end may be elevated at will to reach the high places which it would otherwise be necessary to trim by hand.

Another object is to provide improved cutting means which may be so adjusted as to compensate for wear upon the parts.

A further object is to provide improved means for driving the cutting wheel and supporting the same in the frame.

With these and other objects in view the present invention consists in the combination and arrangement of parts as will be hereinafter more fully described, and particularly pointed out in the appended claims, it being understood that changes in the specific structure shown and described may be made within the scope of the claims without departing from the spirit of the invention.

In the drawings forming a portion of this specification, and in which like numerals of reference indicate similar parts in the several views, Figure 1 is a side elevation of my improved lawn trimmer, Fig. 2 is a similar view of the opposite side thereof, Fig. 3 is a top plan view, Fig. 4 is a vertical section on the line 4—4 of Fig. 2.

Referring to the drawings, 1 indicates a frame of irregular shape, in the rear end of which is revolubly mounted the drive wheel 2. Integrally formed therewith and of slightly smaller diameter is the sprocket wheel 3. This drive wheel and sprocket are provided with a central hub 4, through which extends the shaft 5 having one of its ends headed, the other end thereof being provided with a clamping nut 6, and a collar or sleeve 7 spacing the sprocket from the frame. Similarly mounted on stub shaft 9 in the front of the frame is a second sprocket 8 of considerably smaller diameter than the sprocket 3. These sprockets are connected by the endless driving chain 10 and when the machine is being operated the cutting wheel will be revolved at a very rapid rate by reason of the difference in diameter of the sprockets. A star wheel 11 is also mounted upon the shaft adjacent to the frame 1 and is spaced from the sprocket 8 by the sleeve 12. The teeth of the wheel 11 have one of their edges sharpened to a knife edge and the front lower edge of the frame is similarly sharpened as at 13.

The shaft of the cutting wheel 11 extends through a short slot 14 in the frame and when the sharpened edge of the frame has become dulled at one point, the shaft may be adjusted in the slot and a new point of contact will be presented to the teeth of the cutting wheel. In the rear of the frame and communicating with the shaft opening are the branch slots 15 by means of which the frame may be adjusted up or down to take up slack in the driving chain. An operating handle 16 is secured to the frame, the upper securing pin or bolt 17 being movable in a short slot 18. When it is desired to elevate the forward end of the machine the handle is depressed and the pin moved to the bottom of the slot. Upon continued depression of the handle, the frame will pivot upon the rear shaft 5 and the front end thereof with the cutting wheel will be swung upward. A brace bar 19 has one of its ends secured to the handle and the other to the front shaft 9 by means of the nut 20.

In operation, the machine is placed at the edge of the lawn with the frame in contact with the sod and upon the rotation of the ground wheel, the cutting wheel will be revolved and the superfluous grass and weeds rapidly clipped therefrom, when the lawn will present a neat and attractive appearance. It will be noted that on one side of the frame there are no projections whatever with the exception of the operating handle. This is of material advantage as it allows the grass to be cut very close to the walk or curb, while the frame will also serve as a guide.

My improved lawn trimmer is very simple and inexpensive in construction, easy to operate and highly efficient and durable in use.

What is claimed is:—

1. In a machine of the class described, the combination with a frame plate, of a shaft disposed in the rear end of said plate, a drive wheel revolubly mounted upon said shaft, a sprocket integrally formed therewith, said frame having slots formed therein and diverging rearwardly from said shaft, a shaft disposed in the forward end of said frame plate, a cutting wheel mounted on said shaft, said plate having a slot formed therein and extending rearwardly and downwardly from said shaft, a sprocket mounted upon said shaft, a drive chain connecting said front and rear sprockets, an operating handle pivoted to the forward end of said plate, and a brace bar secured to said handle and to the end of the forward sprocket shaft, substantially as and for the purpose set forth.

2. In a machine of the class described, the combination with a frame comprising a vertical plate, the front vertical edge thereof being sharpened, of a shaft mounted in said frame, a driving wheel mounted upon said shaft, said frame having V-shaped slots therein, said shaft being movable in said slots, a sprocket integrally formed with said wheel, a shaft disposed in the forward end of said frame, a wheel provided with cutting teeth mounted on said shaft, said frame having an additional slot therein, said shaft being adjustable in said slot, a sprocket adjacent to the cutting wheel and rigid therewith, a driving chain connecting the latter sprocket with said first mentioned sprocket, and an operating handle pivoted to said frame substantially as and for the purpose set forth.

In testimony whereof I affix my signature, in presence of two witnesses.

ALONZO C. WARNER.

Witnesses:
WALTER F. SIBLEY,
D. M. YOUNG.